United States Patent [19]

Raibaud

[11] Patent Number: 4,749,312
[45] Date of Patent: Jun. 7, 1988

[54] PROCESS FOR THE DOSING AND TRANSFER OF A GRANULAR PRODUCT AND CORRESPONDING INSTALLATION

[75] Inventor: Jean Raibaud, Bourg la Reine, France

[73] Assignee: Technicatome, Societe Technique pour l'Energie Atomique, Paris, France

[21] Appl. No.: 37,096

[22] Filed: Apr. 9, 1987

Related U.S. Application Data

[63] Continuation of Ser. No. 774,737, Sep. 11, 1985, abandoned.

[30] Foreign Application Priority Data

Sep. 11, 1984 [FR] France .................. 84 13935

[51] Int. Cl.[4] .................................. B65G 53/66
[52] U.S. Cl. ........................... 406/30; 406/12; 406/141; 406/146; 406/171; 406/197; 406/28; 210/189
[58] Field of Search .............. 406/12, 19, 14–17, 406/23–25, 28–33, 21, 106, 109, 141, 142, 146, 197, 171; 210/189

[56] References Cited

U.S. PATENT DOCUMENTS

| | | |
|---|---|---|
| 1,889,163 | 11/1932 | Vogel-Jorgensen ............... 406/142 |
| 2,770,395 | 11/1956 | Sebardt et al. . |
| 3,580,644 | 5/1971 | Ballard .................................. 406/30 |
| 4,088,563 | 5/1978 | Marquardt . |
| 4,461,710 | 7/1984 | Erickson et al. . |

FOREIGN PATENT DOCUMENTS

| | | |
|---|---|---|
| 1356553 | 2/1964 | France . |
| 110608 | 10/1917 | United Kingdom ............... 406/106 |
| 541746 | 3/1977 | U.S.S.R. .............................. 406/25 |

*Primary Examiner*—Joseph F. Peters, Jr.
*Assistant Examiner*—Paul E. Salmon

[57] ABSTRACT

A granular product to be dosed is introduced at the same time as a transfer liquid into a dosing chamber below a retaining grid, provided in the upper part thereof. The measurement of the pressure upstream of the dosing chamber makes it possible to detect the arrival of the product level with the grid and to stop the introduction thereof. An inverted U-shaped pipe forming a syphon then ensures the transfer of the dosed product into a tank, when the compressed air is injected into the dosing chamber above the grid.

4 Claims, 1 Drawing Sheet

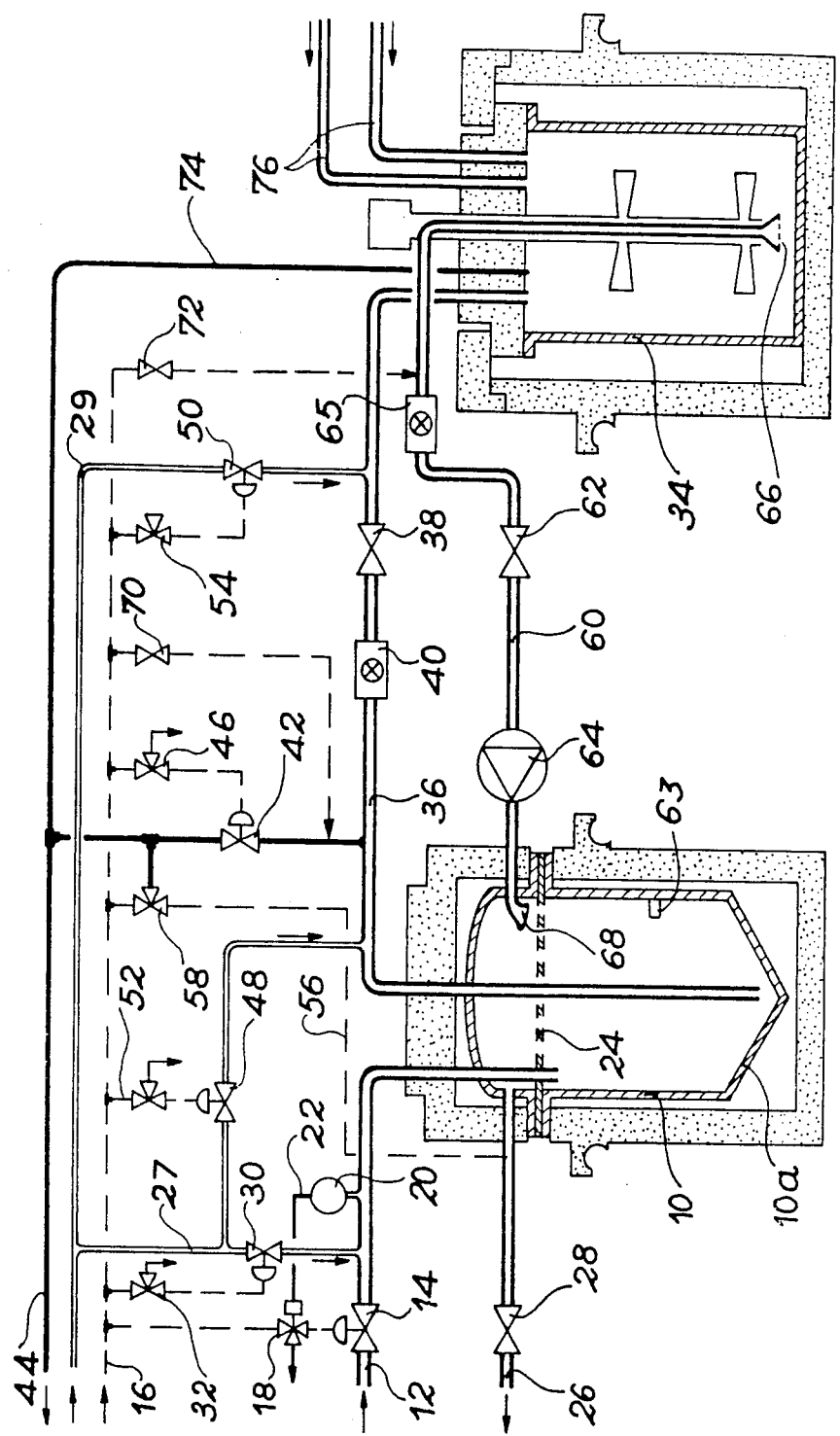

PROCESS FOR THE DOSING AND TRANSFER OF A GRANULAR PRODUCT AND CORRESPONDING INSTALLATION

This application is a continuation of application Ser. No. 774,737, filed Sept. 11, 1983, now abandoned.

BACKGROUND OF THE INVENTION

The present invention relates to a novel process for dosing a granular product, followed by the transfer thereof into a tank or reservoir, as well as to an installation permitting the performance of this process.

The processes conventionally used for dosing a certain product volume in the form of grains of different sizes are usually imprecise and difficult to perform, particularly when the transfer of the product to the dosing chamber or pot is carried out by mixing it with a tansfer liquid, such as water.

The main object of the present invention is a particularly simple dosing process and installation which, without any risk, ensure a precise dosage of a granular product. The invention also relates to a process and an installation permitting the transfer of the dosed product from the dosing chamber to an auxiliary tank using a particularly small transfer liquid quantity and whilst eliminating effluence and ensuring a precise, fast transfer of all the dosed products.

The invention is applicable to the dosing and transfer of all granular products, no matter what the nature of the product and no matter what its grain size. Thus, the invention can be applied to the dosing and transfer of used ion exchange resins from the purification or cleaning chambers of primary circuits of pressurized water nuclear reactors and fuel storage pools, as well as to the chemical, pharmaceutical or argo -alimentary industries.

SUMMARY OF THE INVENTION

The present invention specifically relates to a process for dosing a granular product in a dosing chamber and the transfer of the dosed product into a tank, wherein it comprises the successive stages of dosing the product by introducing the same, mixed with a transfer liquid into the dosing chamber, below a perforated retaining member, whilst discharging the transfer liquid when it exceeds a given level above said retaining member, checking the pressure of the transfer liquid introduced into the dosing chamber and stopping the introduction of the product mixed with the transfer liquid when said pressure exceeds a threshold indicating that the product is in contact with the retaining member; transferring the thus dosed product and the transfer liquid from the dosing chamber into the tank by means of an inverted U-shaped pipe forming a syphon issuing into the bottom of the dosing chamber and the upper part of the tank, the latter being placed substantially at the same level as the dosing chamber, whilst injecting a pressurized gaseous fluid into the dosing chamber above said retaining member; and draining the thus transferred product by pumping the transfer liquid from the tank into the dosing chamber by a pipe, whereof one end which issues into the bottom of the tank has filtering means preventing the passage of the granular product.

Preferably, the draining of the product is checked by measuring the transfer liquid volume discharged into the dosing chamber.

The invention also relates to a dosing and transfer installation making it possible to perform the aforementioned dosing and transfer process.

DESCRIPTION OF THE DRAWING AND PREFERRED EMBODIMENT

A description will now be provided of a non-limitative embodiment of a dosing and transfer installation for performing the process according to the invention with reference to the single drawing diagrammatically showing said installation in part sectional form.

The installation shown in the drawing is intended to carry out the dosing of used ion exchange resins coming from the purification or cleaning chambers of primary circuits of pressurized water nuclear reactors, or from nuclear fuel storage pools, or from any other circuit. These used resins are then transferred into a tank, which in this case is constituted by a kneader, which immobilizes the dosed resins in an organic binder, in order to carry out the coating thereof. However, a comparable installation could be used for dosing and transferring any other granular product, e.g. in the chemical or agro-alimentary industries.

In the represented installation, the granular resins, (e.g. of grain sizes 0.2 to 1.2 mm) are introduced into a dosing chamber 10 by a supply pipe 12 controlled by a pneumatically controlled valve 14. In order to ensure their transfer, the resins are mixed with a transfer liquid, preferably constituted by demineralized water. Valve 14 is connected to a compressed air line 16 via a three-way electrovalve 18, which controls the same. A manometer or pressostat 20 measures the pressure in the supply pipe 12, between valve 14 and dosing chamber 10. Pressostat 20 is connected to electrovalve 18 by an electric valve 22 making it possible to operate the electrovalve when the pressure in pipe 12 exceeds a given threshold.

In the vicinity of its upper dome, the dosing chamber 10 is equipped with a perforated retaining grid 24, which is positioned horizontally and below which issues the end of the supply pipe 12. According to the invention, the perforations formed in grid 24 are such that they retain the granular resins, whilst permitting the passage of the demineralized water ensuring the transfer thereof. A discharge pipe 26 equipped with a valve 28 issues into the dosing chamber 10 above retaining grid 24.

As a result of the structure of the installation described hereinbefore, it is readily apparent that it is possible to dose under excellent conditions and in a simple manner a volume of used ion exchange resins corresponding to the volume defined within the chamber 10 below grid 24.

Thus, valve 28 being open and the operator controlling via the electrovalve 18 the opening of the pneumatic valve 14, the resins mixed with their transfer water continuously enter the dosing chamber 10. For as long as the level of the resins in chamber 10 does not reach grid 24, the pressure detected by pressostat 20 remains below the level for triggering electrovalve 18 and valve 14 remains open. The transfer water then freely passes through the grid 24 and is discharged by discharge pipe 26 without any significant increase in the pressure drop in pipe 12.

As soon as the level of the resins in dosing chamber 10 reaches the level of grid 24, which prevents the passage of resins, there is a significant reduction in the speed of the resins in the supply pipe 12 and this leads to a temporary increase in the pressure in said pipe beyond the threshold defined by pressostat 20. This has the immediate effect of acting on electrovalve 18, in order to close valve 14 by releasing the pressure applied thereto. A precise dosing of the resin is carried out, particularly when the speed in pipe 12 is close to 1.5 m/s.

A pipe 27 for emptying the supply pipe 12 connects the latter, immediately downstream of valve 14, to a demineralized water line 29. Pipe 27 is controlled by a normally closed, pneumatically controlled valve 30, which is linked with the compressed air line 16 via a three-way electrovalve 32.

Pipe 27 issues into chamber 10 at a level chosen in such a way that the volume of water present in the chamber when dosing is ended makes it possible to then carry out the resin transfer to a kneading tank 34 under optimum conditions. Thus, for example, for 100 liters of dosed resin in chamber 10, containing 30 liters of capillary water, pipe 27 permits a "supernatant" water volume of 40 liters to be present above grid 24.

Following the filling of dosing chamber 10 and the automatic closure of valve 14, that part of pipe 12 positioned downstream of the latter is swept by the demineralized water from line 29 following the opening of valve 30 controlled by electrovalve 32. The resins located in this part of pipe 12 are then expelled. When this operation is ended, valve 30 is again closed and the operator closes valve 28, so that the dosing chamber 10 is isolated from the not shown part of the installation upstream thereof.

The installation shown in the drawing also comprises means for transferring in a simple, effective and effluent-free manner the dosed resins located in the chamber 10 to the mixing tank 34, in which the resin can subsequently be coated.

As is illustrated in the drawing, the dosing chamber 10 and kneader 34 are positioned substantially at the same level and are connected by an inverted U-shaped pipe 36 forming a syphon, whereof a first end descends vertically along the axis of chamber 10 to the level of conical bottom 10a in the form of a funnel or hopper and having an angle close to 120° of said chamber. The clearance between the lower end of pipe 36 and the bottom 10a of chamber 10 is preferable equal to the internal diameter of pipe 36. The opposite end of pipe 36 traverses the head of kneader 34 and issues into the upper part thereof. Pipe 36 is equipped with a valve 38 and flow or circulation controller 40.

The upper horizontal part of pipe 36 is connected via a normally closed, pneumatically controlled valve 42 to a gaseous effluent discharge line 44. An electrovalve 46 is placed between the compressed air line 16 and the valve 42 in order to control the latter.

In the vicinity of each of its ends, the upper horizontal part of pipe 36 is also connected to the demineralized water line 29 via two normally closed, pneumatically controlled valves 48 and 50. These valves are controlled by the compressed air line 16, respectively via two electrovalves 52 and 54.

A pipe 56, controlled by a three-way electrovalve 58 alternately connects the compressed air line 16 and the gaseous effluent line 44 to the transfer water discharge pipe 26 upstream of valve 28 and in the immediate vicinity of the dosing chamber 10.

Dosing chamber 10 and kneader 34 are also linked by a pipe 60 equipped with a normally closed valve 62 and a pump 64. Pipe 60 is used for bringing the transfer water from the kneader to the dosing chamber, in order to drain the resin introduced into the kneader. This pipe 60 descends along the axis of kneader 34, in order to issue into the bottom thereof by means of a strainer 66, which prevents the passage of resins into pipe 60. The other end of the latter issues into dosing chamber 10 by a nozzle 68 above grid 24. A circulation controller 65 is also placed in pipe 60. A level indicator 63 placed in the dosing chamber makes it possible to check the water volume discharged by pump 64 into the dosing chamber and consequently to check that the resins have been correctly drained. Normally closed valves 70 and 72 make it possible to link each of the pipes 36 and 60 with the compressed air line 16.

Finally, a pipe 74 passing through the head of kneader 34 makes it possible to discharge from the latter the gaseous effluence to line 44 and one or more pipes 76 also pass through the head of kneader 34 and make it possible to supply the latter with the organic binder used for coating purposes.

When the resin dosing into chamber 10 takes place, valves 38 and 62 are closed and valve 58 occupies the position in which pipe 56 is linked with the gaseous effluent line 44.

When the dosing chamber 10 has been filled with resins and isolated from the upstream installation by the closing of valves 14 and then 28, it is possible to transfer said resins into kneader 34.

Before controlling the transfer, the operator opens valves 38 and 62 in order to connect the chamber and the kneader. The actual transfer is controlled by operating electrovalve 58 which makes it possible, via pipe 56, to inject compressed air from line 16 into the upper part 10 above grid 24. The compressed air introduced into chamber 10 above the water-resin mixture located therein has the effect of expelling said mixture to kneader 34 via pipe 36. Simultaneously, the gases contained in the kneader are discharged to line 44 by means of pipe 74.

It should be noted that the transfer carried out in this way takes place in a relatively homogeneous manner, so that all the resin is transferred into the kneader, which is not the case in the known means, where pumps are used which transfer the liquid faster than the solid and thus bring about an accumulation of the latter, so that part of it is not transferred at the end of the cycle. Moreover, the principle of syphoning the mixture by a small current tube makes it possible to use a water quantity which is reduced to a minimum and effluents are not thrown back.

The end of transfer is detected by indicator 40, which automatically starts up the draining pump 64, in order to transfer the demineralized water mixed with the resins from kneader 34 to dosing chamber 10. The draining or drying quality is checked by measuring the water quantity transferred into the dosing chamber with the aid of level indicator 63.

Simultaneously, the operator breaks the syphon formed in pipe 36 by operating electrovalve 46, in order to open valve 42 and the pipe 36 is rinsed with demineralized water by opening valves 48 and 50 controlled with the air of electrovalves 52 and 54.

When indicator 65 placed in pipe 60 detects the end of draining, the operator stops pump 64 and blows out pipes 36 and 60 by opening electrovalves 70 and 72.

Obviously, the invention is not limited to the embodiment described hereinbefore and in fact covers all variants thereof. Thus, it is clear that according to the envisaged application, the kneader 34 can e.g. be replaced by a storage tank or by a tank or reservoir of any other type. Moreover, the various aforementioned pneumatically controlled valves can be replaced by valves of another type and in particular by manual valves or by electrovalves, without passing beyond the scope of the invention.

What is claimed is:

1. A process for dosing a granular product in a closed dosing chamber and for transferring the dosed product into a closed tank, comprising the following stages: dosing the product by introducing the same, mixed with a transfer liquid into the closed dosing chamber, below a perforated retaining member, checking the pressure of the transfer liquid introduced into the dosing chamber and stopping the introduction of the product mixed with the transfer liquid when said pressure exceeds a threshold indicating that the product is in contact with the retaining member; controlling the volume of transfer liquid introduced into the dosing chamber by discharging the transfer liquid when it exceeds a given level above said retaining member; transferring the thus dosed product and the transfer liquid from the dosing chamber into the closed tank through an inverted U-shaped pipe forming a syphon issuing into the bottom of the dosing chamber and the upper part of the tank, the latter being placed substantially at the same level as the dosing chamber, by injecting a pressurized gaseous fluid into the closed dosing chamber above the given level of transfer liquid; draining the thus transferred product by pumping the transfer liquid from the tank into the dosing chamber through a pipe having one end which issues into the bottom of the tank having filtering means preventing the passage of the granular product; and stopping the draining of the transferred product when the volume of transfer liquid discharged into the dosing chamber corresponds to draining of the transferred product 2. An installation for dosing a granular product, comprising a closed dosing chamber equipped in an upper part thereof with a perforated retaining member, a supply pipe for the product mixed with a transfer liquid, said pipe issuing into the chamber below said retaining member, means for comparing the pressure in said supply pipe with a given threshold corresponding to the product contacting said retaining member, means checked by said pressure comparison means for closing the supply pipe when the pressure exceeds said threshold, a pipe for discharging the transfer liquid issuing into the chamber a given level above said retaining member when the volume of transfer liquid introduced into said chamber reaches a given value, a closed tank arranged substantially at the same level as the dosing chamber, an inverted U-shaped pipe forming a syphon issuing into the bottom of the dosing chamber and into the upper part of the tank, a pipe for injecting a pressurized gaseous fluid issuing into the dosing chamber above said given level, a pipe for draining said product linking the bottom of the tank with the dosing chamber and having transfer liquid pumping means and at its end located in the bottom of filtering means preventing the passage of said granular product, and level indicator means placed in said dosing chamber for indicating the volume of transfer liquid transferred from the tank into the dosing chamber by said pumping means.

3. An installation according to claim 2, wherein the bottom of the dosing chamber is conical and forms an angle of approximately 120°.

4. An installation according to claim 2, wherein the ene of the inverted U-shaped pipe forming the syphon issuing into the bottom of the dosing chamber is spaced from the latter by a distance approximately equal to the internal diameter of said pipe.

* * * * *